United States Patent [19]

Saylor

[11] 4,111,437

[45] Sep. 5, 1978

[54] OIL CONTROL RING SPACER-EXPANDER WITH IMPROVED SLIP LATCH

[75] Inventor: Lee H. Saylor, Muskegon, Mich.

[73] Assignee: Sealed Power Corporation, Muskegon, Mich.

[21] Appl. No.: 720,275

[22] Filed: Sep. 8, 1976

[51] Int. Cl.² ............................. F16J 9/06; F16J 9/18
[52] U.S. Cl. ................................... 277/139; 277/9; 277/155; 277/218
[58] Field of Search ............... 277/138, 218, 219, 9.5, 277/139, 140, 155, 9

[56] References Cited

U.S. PATENT DOCUMENTS

| | | | |
|---|---|---|---|
| 2,893,798 | 7/1959 | Olson | 277/139 |
| 3,099,455 | 7/1963 | Mayfield | 277/140 |
| 3,124,364 | 3/1964 | Burns et al. | 277/139 |
| 3,695,622 | 10/1972 | Davis | 277/139 |
| 3,834,716 | 9/1974 | Okada | 277/9 |

Primary Examiner—Richard E. Aegerter
Assistant Examiner—L. Footland

Attorney, Agent, or Firm—Barnes, Kisselle, Raisch & Choate

[57] ABSTRACT

In a parted spacer-expander for a piston oil control ring of the type which includes an array of alternating inner and outer crowns connected by generally diverging spring legs and a support pad extending radially from each inner crown and connected thereto by a pad leg, an improved slip latch comprising a curved rod having a substantially D-shaped cross section and having a radius of curvature equal to or less than the free-state radius of curvature of the spacer-expander. One end of the latch extends through at least one leg opening formed between the spring legs and pads adjacent the expander ends and is formed with a stop having an axial dimension which prevents passage through the leg openings. The other latch end extends over an arc of at least seventy-five degrees through a plurality of leg openings in the opposite expander end and is free to slide through the leg openings. The free latch end terminates in an inwardly directed beveled face to permit the free end to ride over the edges of the leg openings during sliding motion therethrough.

5 Claims, 9 Drawing Figures

U.S. Patent   Sept. 5, 1978   Sheet 1 of 2   4,111,437
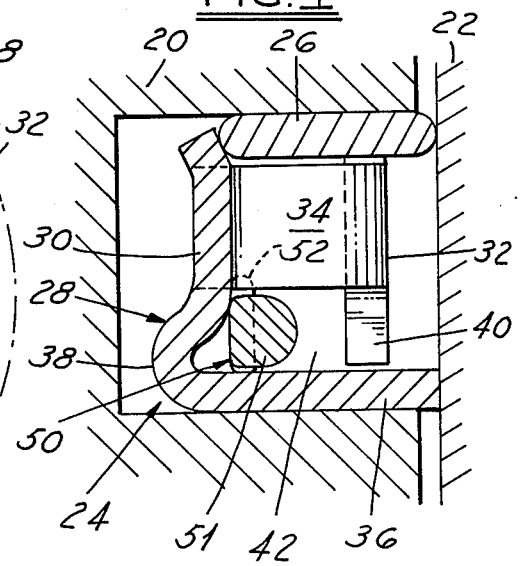
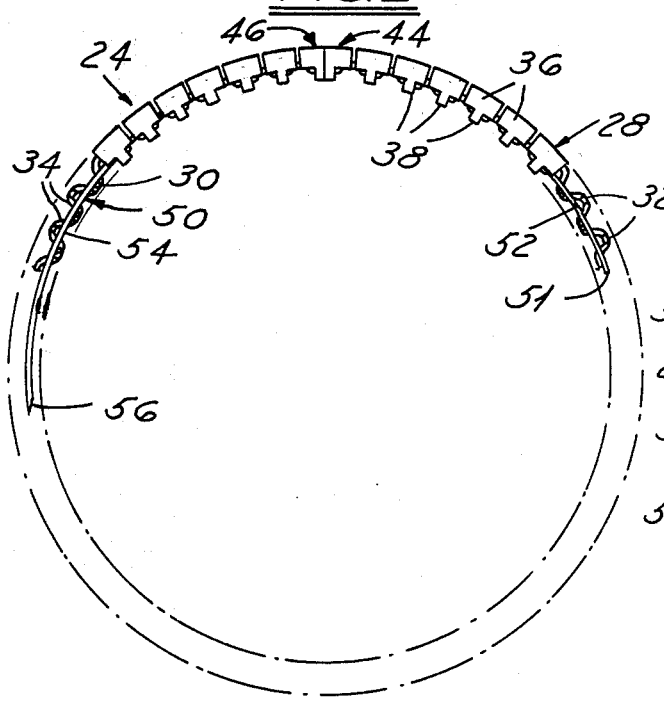
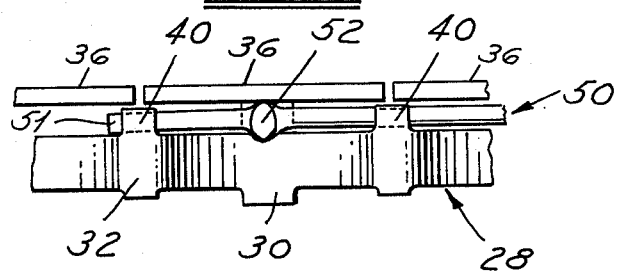
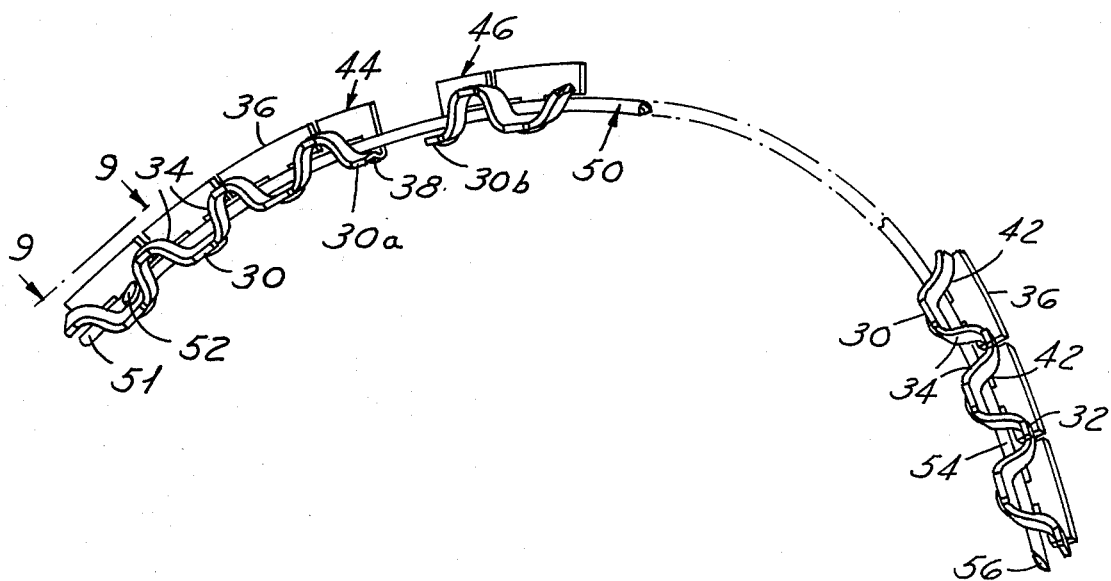

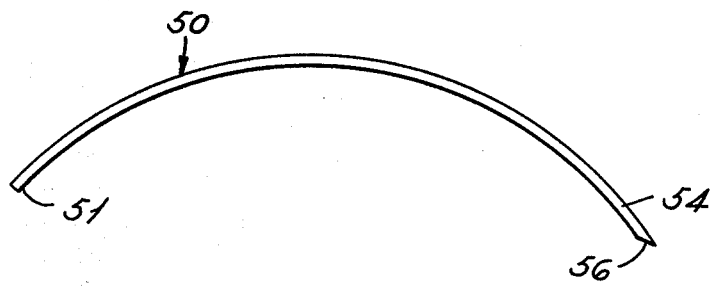
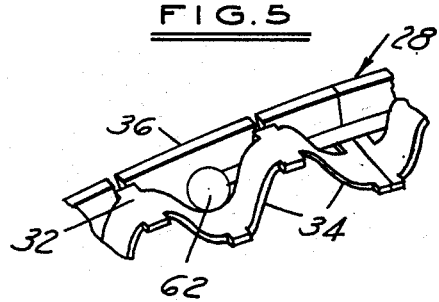
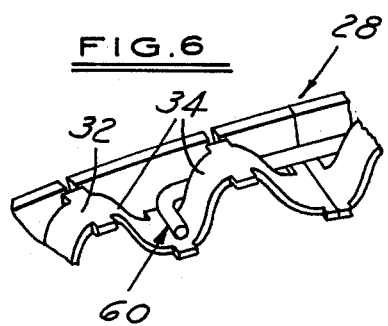
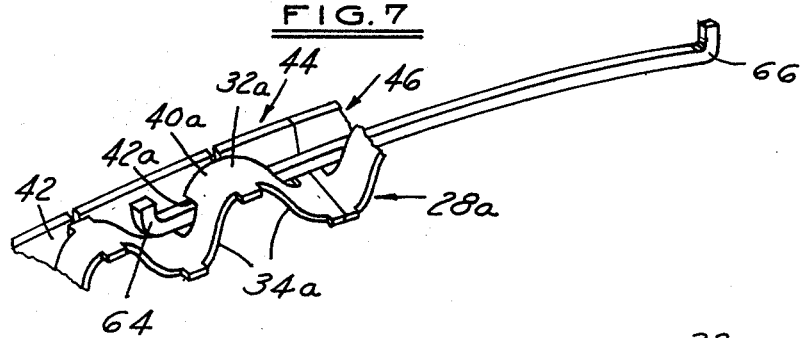
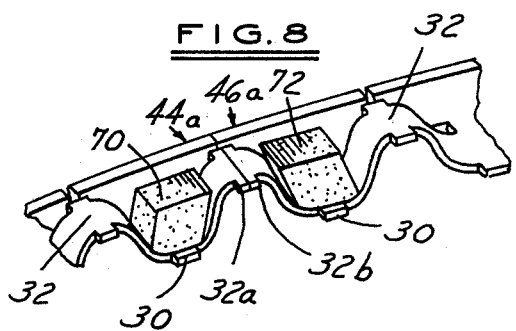

OIL CONTROL RING SPACER-EXPANDER WITH IMPROVED SLIP LATCH

The present invention relates to piston rings and, more particularly, to an improved slip latch and spacer-expander construction for piston oil control rings.

It is an object of the present invention to provide a spacer-expander of the type depicted in Burns et al U.S. Pat. No. 3,124,364 and a slip latch of the type generally shown in Davis et al U.S. Pat. No. 3,695,622 and Okada 3,834,716 which is simple and economical in construction, and which is reliable in operation for preventing overlap of the spacer-expander ends during installation of the expander and latch into an engine. It is another object of the invention to provide a spacer-expander and a slip latch of the referenced type which allows the parted ends of the expander to be widely separated during handling or during the installation process.

The novel features which are considered to be characteristic of the present invention are set forth in particular in the appended claims. The invention itself, however, together with additional objects, features and advantages thereof, will be best understood from the following description when read in conjunction with the accompanying drawings in which:

FIG. 1 is a radial sectional view of an oil control ring, including a spacer-expander and a slip latch in accordance with the invention, installed in an internal combustion engine;

FIG. 2 is a plan view of the oil control ring shown in FIG. 1;

FIG. 3 is a perspective view showing the improved spacer-expander and slip latch provided by the invention;

FIG. 4 is an elevated view of the slip latch shown in FIG. 3 prior to installation into the spacer-expander;

FIGS. 5-7 are perspective views of respective alternative embodiments of the slip latch shown in FIGS. 1-4;

FIG. 8 is a perspective view of a spacer-expander equipped with means for preventing installation of the expander into an engine should the expander ends become overlapped; and FIG. 9 is a sectional view illustrating the stop or deformation formed in the latch of FIG. 4, and is taken along line 9—9 of FIG. 3.

Referring to FIG. 1, a conventional piston 20 is disposed to reciprocate within a cylinder 22 of a gasoline- or diesel-powered internal combustion engine. Piston 20 is provided with the usual peripheral groove in which an oil control ring 24 is disposed for sealing engagement with the opposing wall of cylinder 22. Referring to FIGS. 1-3, oil control ring 24 includes a flat parted circular rail 26 having an outer peripheral edge, and a circular parted spacer-expander 28 disposed to bias the outer edge of rail 26 into sealing engagement with the cylinder wall. Spacer-expander 28 comprises a circumferential series of alternating inner and outer crowns 30,32 interconnected by alternating contiguous legs 34 generally diverging in the radial direction and lending a generally corrugated appearance to the spacer-expander when viewed from the axial direction.

A circumferential series of generally arcuate support pads 36 extends radially outwardly from inner crowns 30, each pad 36 being integrally connected along its inner edge to a corresponding inner crown 30 by a pad leg 38. The outer peripheral edge of each pad 36 is disposed outwardly of outer crowns 32, and is curved in an arc having a diameter equal to the diameter of cylinder 22 so that pads 36 act as oil scraping elements in the assembled and operating condition of control ring 24. The circumferential edges of pads 36 may be slightly beveled to prevent scoring of the cylinder wall. Outer crowns 32 extend at 40 in the direction of pads 36 to space the pads from the outer crowns, and to thus provide an open region between the pads and the spring corrugations which cooperate to form oil drain slots or openings 42 in expander legs 34. Expander 28 is preferably formed in a progressive blanking and bending operation from a continuous length of strip stock. The oil control ring and spacer-expander as thus far discussed is shown and described in greater detail in connection with FIGS. 12-14 of the above-referenced Burns et al patent.

Spacer-expander 28 has the parted ends 44,46 which separate as the spacer-expander is opened for assembly to piston 20, as shown in FIG. 3, and return to the normal or free-state abutting relationship (FIG. 2) when expander 28 and rail 26 are in the piston groove. In the spacer-expander depicted in FIGS. 2-3, expander ends 44,46 are formed between successive outer crowns 32, i.e., to have abutting inner end crowns 30a,30b. Oil drain openings 42 in the embodiment of FIGS. 2-3 have substantially identical radial dimensions between corresponding outer and inner crowns 32,30.

Referring to FIGS. 1-4 and 9, a slip latch 50 is provided to keep expander ends 44,46 in alignment during the assembly operation. Slip latch 50 comprises a curved rod, preferably of nylon or other high-temperature plastic material, having a free-state radius of curvature, as best seen in FIG. 4, which is equal to or, preferably, slightly less than the radius of curvature of expander 28 in its closed or free-state condition. A first end 51 of latch 50 extends through at least the first opening 42 adjacent expander end 44, and preferably through several additional openings 42 to terminate in a stop or deformation 52. Deformation 52 prevents latch 50 from sliding in the circumferential direction more than the distance between two adjacent legs 34.

In opposite expander end 46, a second end 54 of latch 50 extends through a plurality of leg openings 42 over an arc of at least 75° from the abutted expander ends in the free-state condition of the expander, and preferably over an arc in the range of 90° to 135°. End 54 contains no stop or deformation and is thus free to slide through leg openings 42. In accordance with one important aspect of the present invention, free latch end 54 terminates in an inwardly directed beveled or slanted face 56 to allow free end 54 to ride over the opposing edges of inner crowns 30 as the free end is slid through the corresponding leg openings 42. In accordance with yet another aspect of the present invention, latch 50 is substantially D-shaped in radial cross section, as best seen in FIG. 1, with the inside radial edge of the latch being substantially flat.

Slip latch 50 possesses several significant advantages over prior art latches of the type described in the above-referenced Davis et al and Okada patents. For example, the combination of a long free end 54 and a natural radius of latch curvature which is equal to or less than that of the expander results in a latch which inherently tends to resist rotation about its curved axis. Provision of a substantially D-shaped latch cross section is believed to enhance this natural latch stability. Hence, stop 52 may be formed in primarily the axial rather than the radial direction with reference to the expander axis, thereby eliminating the requirement for ensmalled openings near expander ends 34 as taught by Davis et al and Okada. Furthermore, provision of a lengthened free end 54 allows expander 22 to be widely opened during the assembly operation, while beveled face 56 and the flat latch inside radius cooperate to prevent binding during expander closure which may otherwise result because of the latch natural curvature.

To assemble latch 50 to expander 28, latch end 51 is threaded through a desired number of leg openings 42 in expander end 44, and then held in place while latch end 54 is slid through leg openings 42 in expander end 46 as described above. With the latch held in place, stop 52 is then formed by mechanically crimping or radially compressing a portion of latch end 51 between adjacent expander legs 34 to form a stop having an axial dimension greater than the maximum axial dimension of leg openings 42; i.e., greater than the maximum distance between legs 34 and pads 36. The flat inner radius of latch 50 assists the mechanical deformation process by rendering the latch end easier to grip and hold. As an alternative, stop 52 may be formed by touching a hot iron onto an exposed radially outer edge of the latch such that a surrounding portion of the latch is melted and radially compressed. In the preferred embodiment of the invention depicted in FIGS. 1-3 and 9, the radial dimension of stop 52 is essentially irrelevant.

Slip latches of materials other than the preferred nylon, and stop configurations other than that depicted at 52, are also envisioned. For example, slip latch 50 may be formed of metal spring wire, in which case the stop may be formed by bending the end of the latch in the axial direction between two adjacent expander legs 34 as depicted at 60 in FIG. 6. Alternatively, the latch end may be rigidly adhered to an adjacent support pad 36, as depicted at 62 in FIG. 5, by cementing or welding.

In yet another modification in accordance with the invention illustrated in FIG. 7, at least one, and preferably a plurality of leg openings 42a adjacent expander end 44 are radially ensmalled by extending upper crown 32a and extensions 40a part way down expander legs 34a. Latch stop 64 in this modification comprises a tab having a radial dimension large enough to prevent the latch end from sliding through ensmalled openings 42a, but small enough to permit sliding of the latch end through the remaining leg openings 42 of normal dimension. The opposite end 66 of the latch depicted in FIG. 7 may be of extended free length as discussed hereinabove in connection with FIG. 3, in which case stop 64 should be forced between adjacent legs 34a having ensmalled leg openings 42a to limit sliding of the latch. Alternatively, a second radially formed tab adapted to abut correspondingly ensmalled leg openings in expander end 46 may be provided in latch end 66 as shown.

A further modification is depicted in FIG. 8, wherein expander ends 44a, 46a are formed between successive inner crown 30 to have abutting outer end crowns 32a, 32b. A pair of nylon or plastic inserts 70, 72 of the type generally shown in DeBruin U.S. Pat. No. 3,427,014 are respectively adhered or otherwise attached to expander ends 44a, 46a between outer end crowns 32a, 32b and the next adjacent outer crowns 32. Although inserts 70, 72 do not prevent expander ends 44a, 46a from becoming overlapped as does slip latch 50, the inserts do prevent the expander ends from becoming internested, and consequently prevent installation of an overlapped expander into an engine.

The invention claimed is:

1. In combination with a circular spacer-expander for use in a piston oil control ring having a free-state radius of curvature and parted expander ends, and including a plurality of alternating concentric circumferentially spaced inner and outer crowns integrally interconnected by a plurality of generally diverging legs and oil drain openings formed one in each of said plurality of legs, an improved slip latch comprising a curved rod having a radius of curvature equal to or less than said radius of curvature of said spacer-expander, said rod having one end extending through at least one leg opening adjacent one end of said spacer-expander and having means formed in said one end between adjacent spacer-expander legs to limit sliding of said latch in said spacer-expander, said rod further having a second end extending through a plurality of leg openings in the opposing spacer-expander end and being free to slide through said plurality of leg openings, said second rod end terminating in an inwardly directed beveled face to permit said second end to ride over opposing edges of said plurality of leg openings said rod having an inside radial edge which is substantially flat in radial cross section of said rod.

2. The combination set forth in claim 1 wherein said rod is substantially D-shaped in radial cross section.

3. In combination with a circular spacer-expander for use in a piston oil control ring having a free-state radius of curvature and parted expander ends, and including a plurality of alternating concentric circumferentially spaced inner and outer crowns integrally interconnected by a plurality of generally diverging legs, and oil drain openings formed one in each of said plurality of legs, an improved slip latch comprising a curved rod having a radius of curvature equal to or less than said radius of curvature of said spacer-expander, said rod having first and second ends each extending through at least one leg opening adjacent corresponding first and second ends of said spacer-expander and having means formed in at least one of said ends between adjacent spacer-expander legs to limit sliding of said latch in said spacer-expander, said rod further having a substantially D-shaped cross section with the flat portion of the D being on the inside of the rod.

4. The combination set forth in claim 3 wherein said second rod end extends through a plurality of openings in said second spacer-expander end and is free to slide through said plurality of leg openings.

5. The combination set forth in claim 4 wherein said second end of said rod extends through said plurality of leg openings over an arc of at least seventy-five degrees in said free-state condition of said spacer-expander.

* * * * *